United States Patent [19]

Dürr

[11] Patent Number: 4,696,421

[45] Date of Patent: Sep. 29, 1987

[54] METHOD OF DEBURRING OR DEFLASHING ARTICLES

[75] Inventor: Dieter Dürr, Baierbrunn, Fed. Rep. of Germany

[73] Assignee: Linde AG, Wiesbaden, Fed. Rep. of Germany

[21] Appl. No.: 641,555

[22] Filed: Mar. 20, 1986

[30] Foreign Application Priority Data

Mar. 26, 1985 [DE] Fed. Rep. of Germany ....... 3510964
Dec. 12, 1985 [DE] Fed. Rep. of Germany ....... 3543910

[51] Int. Cl.$^4$ .......................... B26F 3/00; B29C 37/02; B29C 35/16
[52] U.S. Cl. .......................................... 225/1; 83/914; 225/93.5; 264/28; 264/570; 264/161
[58] Field of Search ......................... 264/28, 161, 570; 83/914, 170, 53; 225/93.5, 1

[56] References Cited

U.S. PATENT DOCUMENTS

| | | | |
|---|---|---|---|
| 2,985,050 | 5/1961 | Schwacha | 83/53 |
| 3,526,162 | 9/1970 | Wilcox | 83/170 |
| 3,543,619 | 12/1970 | Hellmer | 264/161 |
| 3,878,978 | 4/1975 | Martinek | 225/93.5 |

Primary Examiner—Jan H. Silbaugh
Assistant Examiner—Neil Michael McCarthy
Attorney, Agent, or Firm—Karl F. Ross; Herbert Dubno

[57] ABSTRACT

Flashing waste along a rubber or synthetic resin molded article is removed by initially subjecting the article to contact with a cryogenic coolant to embrittle the flashing and then directing the jet of a cryogenic coolant against the article, preferably at the base of the flashing so that the embrittled waste is broken away.

13 Claims, 2 Drawing Figures 4,696,421

METHOD OF DEBURRING OR DEFLASHING ARTICLES

FIELD OF THE INVENTION

My present invention relates to a method of removing excess material from a shaped article, especially a molded article and, more particularly, to the deburring or deflashing of an article composed of and preferably molded from a material which can be embrittled by treatment with a cryogenic coolant.

BACKGROUND OF THE INVENTION

In various molding processes, e.g. in the production of synthetic resin or elastomeric articles, the molded product is left with material which must subsequently be removed and may result from sprues for feed passages for the molded material, waste which arises because the molded parts do not close with precision against one another, or the like, such wastes being referred to as burrs or flashings.

For the purposes of the present application the deflashing or the removal of such waste will be described as a flashing removal regardless of the nature of the excess which must be removed, the type of article from which the flashing is to be removed, and whether the material is generally termed flashing or a burr or has some other designation for a particular article and its method of fabrication.

Thus the present description applies to articles which are injection molded, die cast, die pressed or even extruded and, indeed, regardless of the particular fabrication technique.

The flashing generally appears as a web projecting from a surface or a thin strip of somewhat irregular form projecting from an edge of the article or workpiece and should be removed as close to the edge or surface as possible, i.e. at the foot or base of the flashing.

In general terms, therefore, the invention is concerned with the removal of all excess material which can be defined as material projecting from the ideal configuration of the article.

It is known to deburr or deflash relatively large molded articles of the type described manually and by various techniques generally involving cutting away of the flashing. Manual flashing removal is extremely expensive. For the removal of such waste by machine, it has been proposed to cool the object to be deflashed to thereby embrittle the flashing and to then break it away.

It is also known to remove rubber flashings or wastes of a filigree pattern in a molded state from grooves, holes and the like with the aid of sand or shot blasting. In the latter case, the article to be deflashed can be tumbled in a container and cooled with a cryogenic medium and then subjected to sand blasting or steel shot blasting.

In another process for the deflashing of articles by mechanical means, the articles are tumbled in the presence of an aggregate or impact medium and the particles of the impact medium gradually break away by random impact against the flashing, the waste material. This process does not provide the desired deflashing quality.

Perforated drums which operate with blast systems of the type described can also be used and while edge wastes can be easily removed in such systems, there is always a danger that the articles will be damaged.

When a shot or sand blasting technique is used for economical reasons it is essential to separate the blast medium, i.e., shot or sand, from the residues removed from the article and to recycle the blast medium. For this purpose, it is necessary to operate in a closed system and this requirement, of course, increases the cost of operation as well as the cost of the apparatus required for carrying out the method.

OBJECTS OF THE INVENTION

It is therefore the principal object of the present invention to provide an improved method of removing waste material from a molded article which can be embrittled by subjecting it to a cryogen, whereby the drawbacks of the abovementioned technique can be obviated.

Another object of this invention is to provide a low-cost method of removing waste from such articles which poses no danger to the article itself and which does not require the recirculation of a shot or sand blast material.

Still another object of the invention is to provide a method for the purposes described which can be carried out with low equipment costs, with articles of practically any size, and which is more efficient than prior art manual or machine techniques.

SUMMARY OF THE INVENTION

These objects and others which will become apparent hereinafter are attained, in accordance with the invention, in a method of removing waste material or deflashing a molded article having flashing waste projecting from a body of the article and in which the flashing is embrittled by a cryogenic coolant and the embrittled flashing is thereupon torn away from the body of the article. According to the invention, a jet of the cryogenic coolant is trained upon the flashing and the flow velocity of the jet is controlled so that the flashing waste is broken away by the force and energy of the jet after cryogenic embrittlement of the waste.

In one aspect of the invention, the flashing best can be embrittled by immersing the entire article in a bath of the cryogenic coolant or by spraying the article with the cryogenic coolant. Thereafter, in accordance with the invention, a jet of cryogenic coolant is trained upon the flashing waste to be removed.

Thus the flashing waste is embrittled in a direct heat exchange with the cryogenic coolant and the velocity of the jet of cryogenic coolant is selected so that the embrittled waste, by the kinetic energy of the jet which consists entirely of the cryogenic coolant(devoid of any sand, shot or any other impact medium), is broken away.

The method of the invention, therefore, is thus readily distinguishable from a system in which the flashing waste is broken away by a solid impact medium or aggregate in that the coolant jet which initially effects the breaking away of the flashing waste can also contribute to the embrittlement and can be discharged especially if it is liquid nitrogen without recovery.

The method of the invention eliminates the need for solid impact media and aggregates and hence the need for recovery and preparation thereof. A closed cycle for the deflashing medium is eliminated and it is also unnecessary to operate in a closed system or apparatus.

The cryogenic coolant jet can be directed exclusively upon the flashing waste, and thus substantially less energy is required to break it away for embrittling the flashing waste. For example, it is no longer necessary to chill the entire article to be deflashed since the embrittlement can be concentrated at the flashing waste and its junction with the body. As a consequence, small amounts of cryogenic coolant can be used for a given waste removal operation.

The invention has been found to be especially effective for the removal of flashing waste on large relatively intricate molded articles, which heretofore had to be deflashed manually, economically and in a simple manner. Preferably, the coolant jet is a full cross section jet, i.e., the cryogenic medium is directed to the flashing over the entire cross section of the jet. A full cross section jet, of course, can be distinguished from a tubular jet. Preferably, moreover, the jet is a 0° jet, i.e., a parallel jet with no divergence angle. The jet should also be homogenous, i.e., consist of droplets and be uniform over its entire cross section.

Advantageously, the article and the jet are removed relative to one another to sweep the jet along the flashing waste, thereby continuously embrittling the jet and breaking away the waste after it has been embrittled.

It has been found to be advantageous, moreover, to direct the jet at high pressure onto the flashing waste and thus it is advantageous to provide a nozzle whose cross section is designed for directing the jet at high velocity and high pressure, and to connect between the liquid cryogen source and this nozzle, a high pressure pump.

A coolant can, moreover, be stored in a supercooled condition, in a high pressure vessel, and can be driven by compressed or pressurized gas under pressure to the nozzle. The nozzles, which can be used, include all nozzles capable of directing jets of the cryogenic coolant in the form of a stream with exceptionally high kinetic energy and with a cross section such that practically only the junction of the flashing waste of the body will be effected so that only the flashing waste will be embrittled.

Preferably the jet is formed by nozzles whose orifice direction is between 0.1 mm and 3 mm using a liquid coolant which is delivered under a pressure between 10 bar and 800 bar and most advantageously between 10 bar and 400 bar.

An especially reliable and exact deflashing is possible in accordance with the invention when the apparatus comprises two parallel nozzles which are spaced apart in the direction of relative movement of the nozzles and the article with the leading jet to be trained first upon the waste to be embrittled and the trailing jet to be trained upon the flashing subsequently to break away from the article by the high kinetic energy described previously.

The leading jet, therefore, serves only for cooling or embrittlement purposes and thus can have a comparatively low flow velocity and kinetic energy of the jet. The impact with the high kinetic energy jet can follow with the spacing between the jets being selected to allow sufficient embrittlement of the waste caused by the leading jet.

This method has been found to be especially effective with flashing wastes of relatively small thicknesses and which might be deflected before embrittlement by a jet of high kinetic energy.

According to another feature of the invention, a jet of the cryogenic coolant can be initially deflected from a direct path with which the jet is trained against the flashing waste so that the cryogenic liquid stream traveling along the deflected path is allowed to pass onto the waste to embrittle the latter whereupon the direct jet is trained against the waste to break it away by its higher energy. In this embodiment of the invention only a single coolant jet is required for embrittlement and deflashing. The deflection of the jet allows part of the kinetic energy of the jet to be dissipated before the stream contacts the flashing waste for embrittlement. The deflected stream is here moved relative to the article to be deflashed.

Naturally it is desirable that initially the jet not be trained directly onto the flashing waste but rather that the jet be deflected and swept along the flashing waste for embrittlement. The deflection can use any structure which intercepts the stream, e.g. a diaphragm or stream guide. Only when the flashing waste has been sufficiently embrittled is the coolant stream permitted to impinge directly upon the waste to break it away.

It has been found to be important especially for economical reasons to train the jet exclusively at the base or foot of the flashing waste so that only the portion connecting the waste to the body of the article is embrittled.

In spite of the fact that the entire flashing may not be embrittled it may nevertheless be broken away readily from the article. Naturally this requires a particularly fine coolant jet, i.e. a coolant jet with a very small diameter.

The cryogenic coolant which can be used in any liquefied gas which can be released safely into the atmosphere and is preferably liquid nitrogen as noted earlier because the latter has a particularly low boiling point and is totally innocuous upon release into the atmosphere.

Naturally the nozzle arrangement will depend upon the shape of the article, and the flashing waste and it has been found to be particularly advantageous to provide the nozzle or nozzles on one or more robotically controlled arms, hereinafter referred to as robots, whose orientation can be preprogrammed for a given movement along articles of a given shape with relative displacement of the articles and the robot station along a predetermined path.

It has also been found to be advantageous to provide a pulsating coolant jet to break away the waste material. Such a pulsating jet greatly enhances the deflashing effectiveness of the method of the invention.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
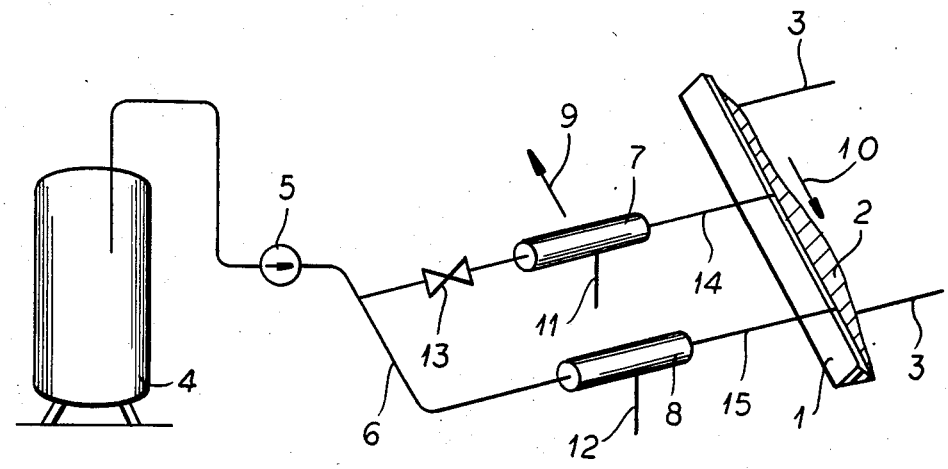
FIG. 1 is a diagram illustrating one embodiment of an apparatus for carrying out the method of the invention.

From FIG. 1 it can be seen that an article 1, preferably a molded or extruded synthetic resin or rubber article, can have a flashing waste 2 along an edge of the article and can be held in a diagrammatically illustrated holder 3, e.g. forming part of a carriage which enables the article to be moved past a pair of nozzles 7, 8, training respective jets 14, 15 against the flashing at its foot or base where the flashing is connected to the body 1 of the article.

The cryogenic coolant is liquid nitrogen which, upon embrittlement of the flashing waste and removal thereof, can evaporate into the atmosphere as an inert gas without environmental detriment.

The liquid nitrogen is stored in the tank 4. The liquid nitrogen can be supercooled and can be displaced by a high pressure pump, e.g. the low temperature piston pump KP 3 L-36180 V with evaporator having a reduced feed level, (e.g. 1 m $H_2O$ column).

In the high pressure pump, pressure of the nitrogen is raised to about 400 bar. The high pressure liquid nitrogen is fed via lines 6 to the schematically illustrated nozzles 7 and 8. Arms 9 and 10 represent the relative movement of the article 1 on the nozzle 7,8.

Naturally, it does not make any difference whether the article is moved with respect to stationary nozzles or the nozzles are moved jointly with respect to a stationary article but preferably the two nozzles are carried by an industrial robot which has not been illustrated in detail but is represented by the arms 11 and 12. The industrial robot can move the nozzles 7 and 8 along the waste 2 while directing the jets 14 and 15 at the base of the flashing and maintaining a spacing between these jets such that the low speed jet 14, which is throttled by the valve 13, does not deflect the flashing but bathes the latter in the cryogenic coolant to embrittle it. The nitrogen from the nozzle 7 thus is under a lower pressure than the nitrogen delivered from the nozzle 8.

Advantageously, the nozzle 7 is a flat-jet nozzle to which the liquid nitrogen is supplied at a pressure of about 0.2 to 6 bar.

The jet which can be trained exclusively to the foot of the waste 2 embrittles this region to allow the high energy nozzle 8 to direct the jet 15 against the waste with a force sufficient to break off the embrittled waste. The nozzle 8, (for example, using an orifice disc 4916-29 with a diameter of 0.736 mm from Spraying-Systems) is supplied with liquid nitrogen at a pressure of, say, 100 bar and a full section jet with no divergence is directed against the waste which consists of plastic or rubber as noted.

Figure 2:
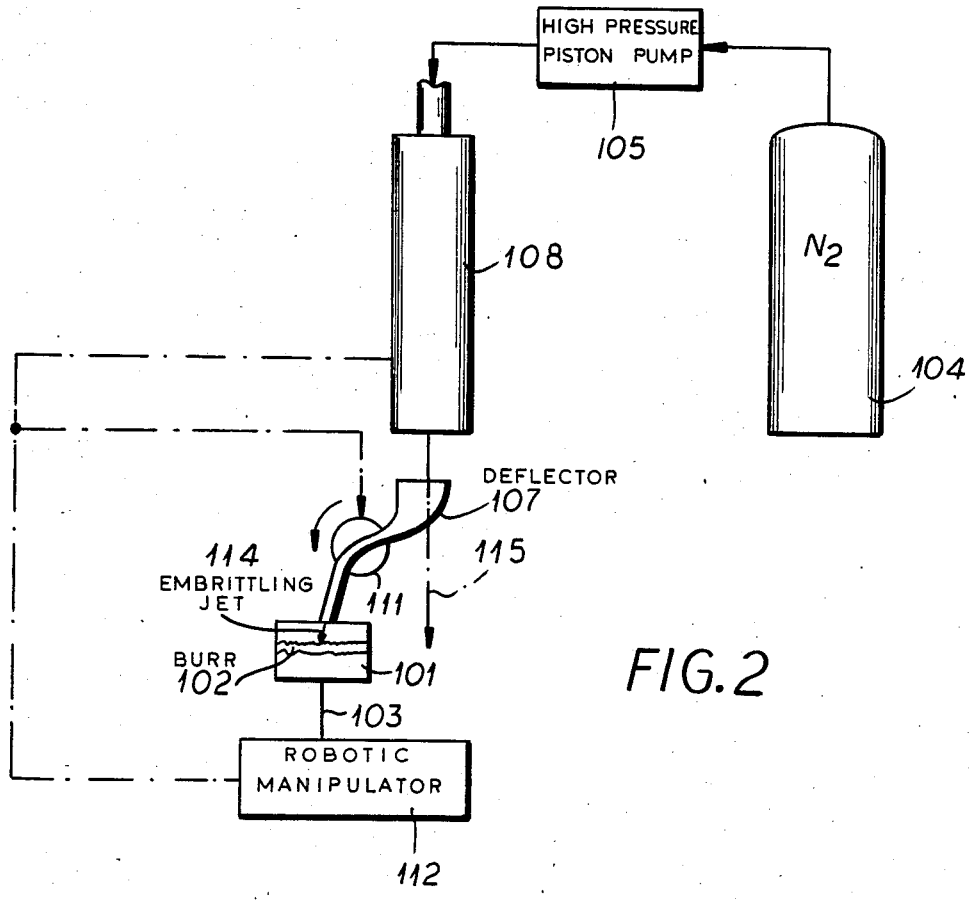
FIG. 2 is a diagram showing a second apparatus for carrying out the method.

In the embodiment of FIG. 2, the nitrogen tank 104 is connected by a high pressure piston pump 105 to a nozzle 108 which can be analogous to the nozzle 8 previously described.

Here, however, a deflector 107 which can be rotated by the support 111 is provided to intercept the jet and sweep it in a lower velocity stream 114 along the foot of the flashing 2 at its junction with the body 101. Rotation of the deflector causes the embrittling jet 114 to sweep the waste and embrittle the latter. Subsequently, the deflector 107 is withdrawn from the path of the jet emerging from the nozzle 108 and this jet, represented at 115, is directed at the waste to break it off. The relative movement between the deflector 107 and the article 101 and between the nozzle 108 and the article 101 is effected by the robotic manipulator 112 which has been shown in block diagram form.

I claim:

1. In a method of removing a flashing from an article having a flashing waste projecting from a body of the article and in which the flashing can be embrittled by a cryogenic coolant and the embrittled flashing can be broken away from the body, the improvement which comprises the steps in combination of:
   initially embrittling said flashing by subjecting said flashing to a cryogenic coolant; and
   thereafter training a jet substantially consisting exclusively of said cryogenic coolant upon said flashing and controlling the flow velocity of said jet so that the flashing waste is broken away solely by the force and energy of said jet after embrittlement of said flashing waste, at least a portion of said jet being deflected onto said flashing initially to embrittle said flashing before the full jet is directly trained on said flashing to cut away said flashing.

2. The improvement defined in claim 1 wherein said jet is a full cross section jet.

3. The improvement defined in claim 1 wherein said jet has a divergence in the direction of said article of 0° to 10°.

4. The improvement defined in claim 3 wherein said jet is a parallel jet having a divergence of 0°.

5. The improvement defined in claim 1, further comprising relatively displacing said article and said jet during training of said jet upon said flashing so that said jet sweeps along said flashing to break said waste away from said body.

6. The improvement defined in claim 1 wherein said jet is formed in a nozzle to which said cryogenic coolant is fed under high pressure.

7. The improvement defined in claim 6 wherein said nozzle has an orifice diameter between 0.1 to 3 mm and said coolant is fed to said nozzle with a pressure between 10 bar and 800 bar.

8. The improvement defined in claim 7 wherein said pressure is between 10 bar and 400 bar.

9. The improvement defined in claim 1 wherein said jet is trained exclusively upon a region of said flashing at which said flashing is attached to said body.

10. The improvement defined in claim 1 wherein said cryogenic coolant is a liquefied gas.

11. The improvement defined in claim 10 wherein said cryogenic coolant is liquid nitrogen.

12. The improvement defined in claim 1 wherein said jet is formed by a nozzle, one of said nozzle and said article being provided with a holder, further comprising displacing said holder in accordance with a predetermined program by a robotic mechanism along a predetermined path to shape said jet along said flashing.

13. The improvement defined in claim 1, further comprising the step of pulsating said jet.

* * * * *

UNITED STATES PATENT AND TRADEMARK OFFICE
CERTIFICATE OF CORRECTION

PATENT NO. : 4,696,421

DATED : 29 September 1987

INVENTOR(S) : Dieter DÜRR

It is certified that error appears in the above-identified patent and that said Letters Patent is hereby corrected as shown below:

Title page:

Item [21] to read:

--[21] Appl. No.: 841,555 --

Signed and Sealed this

Twenty-second Day of March, 1988

Attest:

DONALD J. QUIGG

*Attesting Officer*      *Commissioner of Patents and Trademarks*